March 31, 1936.    G. F. A. CORTS    2,035,790
WHEEL TIRE
Filed Jan. 23, 1934
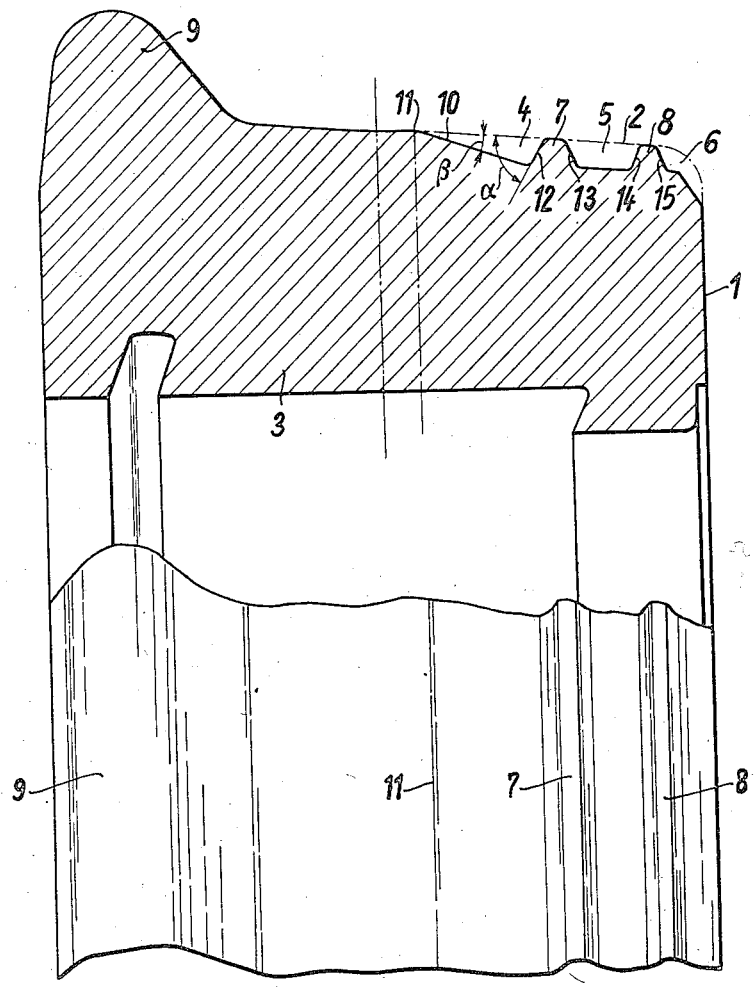
Inventor:
Gottfried Friedrich Adolf Corts
By Knight Bros.
His Attys.

Patented Mar. 31, 1936

2,035,790

UNITED STATES PATENT OFFICE 2,035,790

WHEEL TIRE

Gottfried Friedrich Adolf Corts, Gottenborg, Sweden

Application January 23, 1934, Serial No. 707,973
In Germany February 11, 1933

8 Claims. (Cl. 295—31)

This invention relates to wheel tires, more particularly those intended for railway vehicles, and has for its object so to improve tires of this kind that the conical shape of the tread of the original cross section of the tire automatically is maintained during service. The tire thus shall have such a shape that all parts of the tread wear uniformly, although the tread is stressed differently at different places.

According to the invention this object is obtained by providing annular grooves of different shape, for example of triangular and trapezoidal cross section, near the outer edge of the tread, between which grooves remain ribs of tooth-like cross section.

Furthermore, according to the invention, the groove nearest the flange of the tire is a triangular groove whose side joining the smooth portion of the tread surface has a slight inclination with respect to the tread surface. This triangular groove is followed by a rib the top width of which is about equal to its height. By this arrangement the result is obtained, especially with tires made from soft material, that the groove situated nearest to the flange does not fill with material and that the material does not scale at the place where the groove begins, because of the gradual transition from the tread surface into the groove.

In order that the invention may be clearly understood and readily carried into effect, a preferred embodiment of the same is illustrated by way of example in the accompanying drawing, which shows a railway tire according to the invention in cross section.

Near the outer edge 1 of the tread of the tire 3 are provided grooves 4, 5, 6 of different shape, for example of triangular and trapezoidal cross section. Between each two grooves remains a rib 7 and 8, respectively, of tooth-like cross section, the top width of these ribs being approximately equal to, but preferably somewhat smaller than their height. These ribs 7 and 8 are bisected approximately by the planes of their central rolling circles.

The grooves are arranged in such a manner, that a triangular groove 4 is nearest to the flange 9 of the tire. The groove 4 has a flank 10 which is turned toward the flange 9 and goes over to the tread 2 with slight inclination. The flank 10 begins close behind the central plane of the tire 3 at 11 and extends for about a quarter of the width of the whole tread 2. The flank 12 of the triangular groove 4 or of the adjacent rib 7 extends about at a right angle relatively to the flank 10 of the groove 4. The angle $\alpha$ the flank 12 forms with the tread 2 thus is steeper than the corresponding angle $\beta$ of the flank 10 which amounts only to about 12°, and is about $(90-\beta)°$. The remaining flank angles of the ribs 7 and 8 are about equal to or greater than angle $\alpha$. Preferably the flank angles increase the more, the nearer they lie to the outer edge 1 of the tire 3, while the top width and height of the ribs 7 and 8 decrease in the same ratio. The ribs 7 and 8 can have a steep sided trapezoidal cross section, because they are somewhat separated from the highly stressed portion 11 and are largely spared the hammer action of the rail impacts. This makes it possible to utilize the advantage of ribs of this cross section, that they retain substantially the same width as they wear down and afford nearly uniform wear. The flank 13 of the rib 7, facing the outer edge 1, is formed by the trapezoidal groove 5 which also forms the flank 14, facing the flange 9 of the tire, of the outermost rib 8 situated near the outer edge 1, the other flank of rib 8 being formed by a groove 6.

In lieu of the second rib 8 a rib of saw-tooth cross section or several ribs of such a cross section may be provided therefor.

What I claim as my invention is:—

1. A wheel tire having a flange and a tread, annular grooves of triangular and trapezoidal cross sections on the tread portion of the tire remote from the flange forming ribs of tooth-like trapezoidal section between said grooves.

2. A wheel tire having a flange and a tread, annular grooves of different geometric cross sections on the tread portion of the tire in proximity to the outer edge remote from said flange forming ribs of tooth-like trapezoidal cross section between said grooves, said grooves and ribs comprising, in sequence from the flange to the outer edge of the tire, a groove of triangular cross section the flank of which nearer the flange passes into the tread with a slight inclination, and a rib adjacent to said groove, the top width of said rib being about equal to the height of the latter.

3. A wheel tire having a flange and a tread, annular grooves of different geometric cross sections on the tread portion of the tire in proximity to the outer edge remote from said flange forming ribs of tooth-like trapezoidal cross section between said grooves, said grooves and ribs comprising, in sequence from the flange to the outer edge of the tire, a groove of triangular cross section the flank of which nearer the flange passes into the tread with a slight inclination, and a rib adjacent to said groove, the top width of said rib being about equal to the height of the latter while its flanks have a greater inclination relatively to the tread than said first-mentioned flank.

4. A wheel tire having a flange and a tread, annular grooves of different geometric cross sections on the tread portion of the tire in proximity to the outer edge remote from said flange forming ribs of tooth-like trapezoidal cross section between said grooves, said grooves and ribs comprising, in sequence from the flange to the outer edge of the tire, a groove of triangular cross section the flank of which nearer the flange passes into the tread with an inclination of about 12° and extends for about a quarter of the width of the tread, and a rib of tooth-like cross section adjacent to said groove, the top width of said rib being about equal to the height of the latter.

5. A wheel tire having a flange and a tread, annular grooves of different geometric cross sections on the tread portion of the tire in proximity to the outer edge remote from said flange forming ribs of tooth-like trapezoidal cross section between said grooves, said grooves and ribs comprising, in sequence from the flange to the outer edge of the tire, a groove of triangular cross section the flank of which nearer the flange passes into the tread with an inclination of about 12° and extends for about a quarter of the width of the tread, and a rib of tooth-like cross section adjacent to said groove, the top width of said rib being about equal to the height of the latter while its flanks have a greater inclination relatively to the tread than said first-mentioned flank.

6. A wheel tire having a flange and a tread, annular grooves of different geometric cross sections on the tread portion of the tire in proximity to the outer edge remote from said flange forming ribs of tooth-like trapezoidal cross section between said grooves, said grooves and ribs comprising, in sequence from the flange to the outer edge of the tire, a groove of triangular cross section the flank of which nearer the flange passes into the tread with an inclination of about 12° and extends for about a quarter of the width of the tread, a rib adjacent to said groove, and at least another rib near the outer edge of the tread, the steepness of the flanks of said ribs increasing toward the outer edge of the tire, while their top width and height decrease in the same ratio.

7. A wheel tire having a flange and a tread, a plurality of annular grooves in said tread on the part remote from said flange, the groove nearest said flange being triangular with its side nearest said flange forming an angle with the tread surface which is relatively small in comparison with the angles between the other sides of said grooves and the tread surface.

8. A wheel tire as described in claim 7, wherein the grooves outside of said groove nearest said flange are separated by annular ribs of trapezoidal form.

GOTTFRIED FRIEDRICH ADOLF CORTS.